US011291045B2

(12) United States Patent
Hedayat et al.

(10) Patent No.: US 11,291,045 B2
(45) Date of Patent: Mar. 29, 2022

(54) IMPLEMENTATIONS OF WIRELESS CHANNEL MONITORING AND USAGE

(71) Applicant: Charter Communications Operating, LLC, St. Louis, MO (US)

(72) Inventors: Ahmad Reza Hedayat, Aliso Viejo, CA (US); Amitav Mukherjee, Elk Grove, CA (US); Maulik V. Vaidya, Palmdale, CA (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 16/546,828

(22) Filed: Aug. 21, 2019

(65) Prior Publication Data

US 2021/0058966 A1    Feb. 25, 2021

(51) Int. Cl.
*H04W 74/08*    (2009.01)

(52) U.S. Cl.
CPC .............. *H04W 74/0808* (2013.01)

(58) Field of Classification Search
None
See application file for complete search history.

(56) References Cited

U.S. PATENT DOCUMENTS

2020/0084635 A1* 3/2020 Nilsson ............. H04W 74/0808
2020/0120710 A1* 4/2020 Viorel ................... H04W 16/14

* cited by examiner

*Primary Examiner* — Kouroush Mohebbi
(74) *Attorney, Agent, or Firm* — Armis IP Law, LLC

(57) ABSTRACT

According to one configuration, a system includes a mobile communication device. The mobile communication device includes monitor hardware operative monitor for presence of a repetitive pattern present in received wireless communications present in a network environment. Depending on a magnitude of wireless energy of a portion of received wireless communications including the repetitive pattern, communication management hardware of the wireless station controls transmission of wireless communications from the wireless station. Thus, depending on a detected energy level of the monitored wireless signals having a particular signature (such as the repetitive pattern), the mobile communication device controls subsequent transmission of wireless communications from the mobile communication device in the network environment.

44 Claims, 10 Drawing Sheets

IMPLEMENTATIONS OF WIRELESS CHANNEL MONITORING AND USAGE

BACKGROUND

In general, a conventional listen before talk (LBT) protocol includes monitoring a wireless channel or narrow bandwidth before initiating wireless transmissions from a respective wireless station.

For example, if a power level of wireless communications in a monitored bandwidth is below a threshold value, the corresponding wireless station assumes that the monitored bandwidth is not being used by other devices in which case the corresponding wireless station then communicates over the previously monitored bandwidth during the respective acquired channel occupancy time.

Thus, conventional LBT techniques can be used by a radio device to find a network that is free for use by the monitoring wireless station implementing the listen before talk procedure.

BRIEF DESCRIPTION OF EMBODIMENTS

This disclosure includes the observation that conventional techniques of implementing shared use of wireless bandwidth suffer from deficiencies. For example, conventional techniques of monitoring the overall power level in a wireless network environment only indicate usage of the particular wireless channel and not what type of device or protocol is used by currently transmitting devices.

Embodiments herein provide improved monitoring of a shared wireless spectrum (such as wireless channel, wireless bandwidth, etc.) and use of same.

More specifically, one embodiment herein includes a wireless station. The wireless station includes monitor hardware and communication management hardware. The monitor hardware of the wireless station (such as a mobile communication device, wireless base station, etc.) monitors for presence of a repetitive pattern present in received wireless communications. The monitor hardware produces a first signal whose magnitude varies depending on a magnitude of wireless energy of a portion of the received wireless communications including the repetitive pattern. The communication management hardware of the wireless station then controls transmission of wireless communications from the wireless station in the network environment depending on a magnitude of the first signal.

In accordance with further embodiments, the communication management hardware compares the first signal to a first threshold value. In one embodiment, the communication management hardware prevents transmission of the wireless communications from the wireless station in response to detecting that the magnitude of the first signal is greater than the first threshold value.

In yet further embodiments, the monitor hardware receives timing attributes indicating a time difference value in which to monitor for presence of the repetitive pattern in the received wireless communications. In one embodiment, the communication management hardware identifies the wireless communications including the repetitive pattern based on detecting a first instance of the repetitive pattern delayed by the time difference value with respect to a second instance of the repetitive pattern.

In still further example embodiments, the monitor hardware identifies the portion of the received wireless communications including the repetitive pattern based on a time difference between a first instance of the repetitive pattern and a second instance of the repetitive pattern in the received wireless communications.

Further embodiments herein include, via the monitor hardware associated with the wireless station, producing a second signal whose magnitude varies depending on a received signal strength (such as total power level) of the received wireless communications (which potentially represents a combination of power associated with communications using multiple different protocols). In such an instance, the communication management hardware controls transmission of the wireless communications from the wireless station in the network environment depending on a magnitude of the second signal as well as the first signal.

In accordance with further embodiments, the communication management hardware performs operations of: i) comparing the second signal to a second threshold value, and ii) preventing transmission of the wireless communications from the wireless station in response to detecting that the magnitude of the second signal is greater than the first threshold value. Additionally, according to further embodiments, the communication management hardware can be configured to adjust a magnitude of the second threshold value depending on the magnitude of the first signal.

In still further embodiments, the communication management hardware adjusts a threshold value depending on the magnitude of the first signal and compares a signal strength of the overall received wireless communications to the adjusted threshold value. In one embodiment, the wireless communications from the wireless station are then communicated in accordance with a first wireless protocol; the portion of the received wireless communications in which the repetitive pattern adjusted input signal identified are of a second wireless protocol different than the first wireless protocol. In such an instance, the wireless station monitors for presence of wireless communications according to the first wireless communication protocol but transmits according to a second wireless communication protocol from the wireless station.

Further embodiments herein include, via the monitor hardware, monitoring for presence of the repetitive pattern in the received wireless communications in response to detecting an inability of the wireless station to acquire a shared wireless channel using listen before talk technology.

In still further embodiments, the monitor hardware monitors the wireless network environment for a first repetitive pattern and a second repetitive pattern in a shared wireless channel. Detection of the first pattern indicates use of a corresponding first wireless communication protocol over the shared wireless channel. Detection of the second pattern indicates use of a corresponding second wireless communication protocol over the shared wireless channel.

In yet further embodiments, the monitor resource monitors for presence of a first repetitive pattern such as a cyclic prefix pattern associated with a transmitted symbol such as in a data packet; the monitor resource also monitors for presence of a second repetitive pattern is a repeatedly transmitted preamble communicated present in the data packet. Thus, monitoring for presence of first wireless communications can include monitoring for presence of two or more repetitive patterns in received wireless communications.

In yet further embodiments, the monitored repetitive pattern is a first repetitive pattern. The wireless station receives configuration setting information from a wireless base station and applies the received configuration setting information to the monitor hardware disposed in the wireless station. The monitor hardware monitors for presence of the first repetitive pattern and a second repetitive pattern as indicated by the configuration setting information. In one embodiment, the first repetitive pattern corresponds to presence of received wireless communications transmitted in accordance with the first wireless protocol; the second repetitive pattern corresponds to a second wireless protocol and corresponding received second communications.

Further embodiments herein include, at the monitor hardware of the wireless station, receiving configuration setting information from a wireless base station; the configuration setting information indicates attributes of the repetitive pattern to monitor in the wireless network environment.

In accordance with still further embodiments, the repetitive pattern corresponds to a particular wireless protocol at which a portion of the received wireless communications are transmitted.

Embodiments herein further include monitoring for presence of multiple different repetitive patterns associated with a particular wireless communication protocol. If desired, a wireless base station can be configured to communicate control instructions to the user equipment indicating which of one or more repetitive patterns for the particular wireless communication protocol are to be monitored by the user equipment. In accordance with further embodiments, the repetitive pattern is a first repetitive pattern. Detection, via a first communication analyzer resource, of the first repetitive pattern in the received wireless communications indicates a beginning of a wireless communication transmitted in accordance with a particular wireless communication protocol. Embodiments herein further include implementing a second communication analyzer resource. The second communication analyzer resource monitors for presence of a second repetitive pattern in the wireless communication. The second communication analyzer resource detects presence of the second repetitive pattern in the wireless communication; detection of the first repetitive pattern and the second repetitive pattern in the wireless communication indicating that the wireless communication is transmitted in accordance with the particular wireless communication protocol.

In accordance with further embodiments, a first communication analyzer resource detects presence of a first repetitive pattern in received wireless communications. The first repetitive pattern indicates a beginning of a wireless communication transmitted in accordance with a particular wireless communication protocol. A second communication analyzer resource monitors for presence of a second repetitive pattern in the wireless communication. The second analyzer resource (detector) detects presence of the second repetitive pattern in the wireless communication. Detection of the first repetitive pattern and the second repetitive pattern in the wireless communication indicates that the wireless communication is transmitted in accordance with the particular wireless communication protocol.

In yet further embodiments, the second repetitive pattern is detected as being present in the wireless communication after an amount of time with respect to the first detected repetitive pattern, the amount of time (such as a duration associated with the particular wireless communication protocol) is indicative that the wireless communication is transmitted in accordance with the particular wireless communication protocol. Accordingly, occurrence of a second repetitive pattern after the duration of time is indicative of the particular wireless communication protocol. This technique can be used in any of the analyzer resources (detectors) as described herein to further enhance the detection of a wireless frame for a given wireless protocol being monitored and detected.

Note further that embodiments herein are useful over conventional techniques of monitoring a general received signal strength of all communications in a monitored bandwidth. For example, it is becoming more common that a particular bandwidth is occupied by different types of wireless stations, which communicate using different wireless communication protocols. The conventional monitoring of a wireless bandwidth provides no indication of the different types of wireless protocols that are being used to support communications in the given bandwidth. As described herein, in contrast to conventional techniques, monitoring of a wireless bandwidth for wireless communications of one or more particular types, based on monitoring for presence and signal strength of one or more repetitive patterns (signatures) associated with the one or more wireless protocol types of interest, provides a novel basis in which to control transmission of wireless communications from the wireless station. For example, the detected amount of wireless energy associated with each of different types of wireless communications in a shared wireless bandwidth enables a controller to control wireless communications from the wireless station depending on wireless energy associated with different protocols being used to transmit data in the wireless network environment. For example, if the wireless station detects communications at a first wireless communication protocol, which is assigned a higher priority than a second wireless communication protocol at which the wireless station transmits communications, the wireless station prevents transmission of communications using the second wireless communication protocol.

Note that any of the resources as discussed herein can include one or more wireless stations, computerized devices, mobile communication devices, sensors, servers, base stations, network nodes, wireless communication equipment, communication management systems, monitors, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable hardware storage medium and/or system having instructions stored thereon. The instructions, when executed by the computer processor hardware, cause the computer processor hardware (such as one or more co-located or disparately processor devices or hardware) to: monitor for presence of a repetitive pattern in received wireless communications; produce a first signal whose magnitude varies depending on a magnitude of wireless energy of a portion of the received wireless communications including the repetitive pattern; and control transmission of wireless communications from the wireless station in the network environment depending on a magnitude of the first signal.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of wireless communications. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
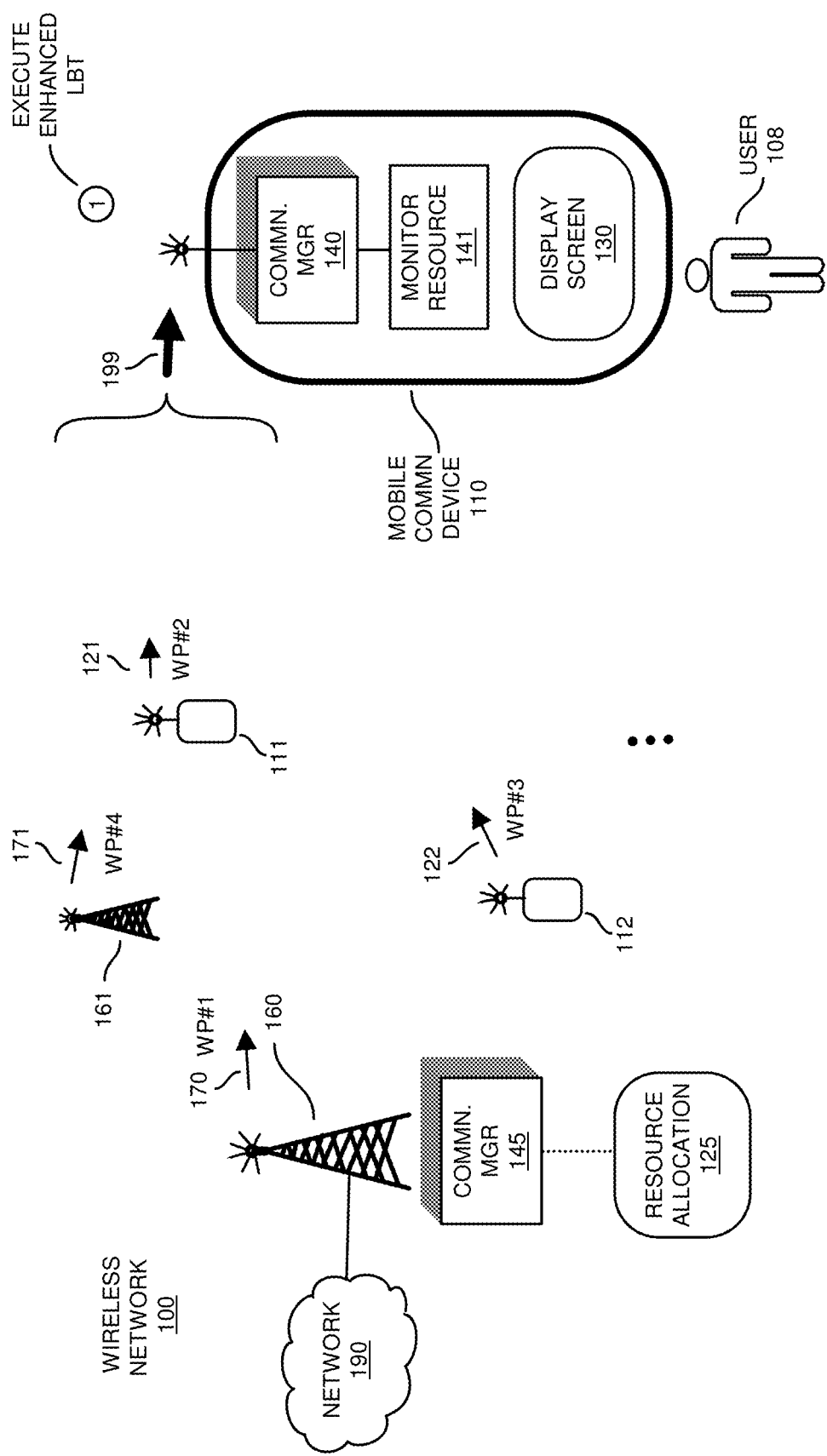
FIG. 1 is an example diagram illustrating monitoring of a network environment for wireless communications according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DESCRIPTION OF EMBODIMENTS

Embodiments herein include a mobile communication device (first wireless station). The mobile communication device includes monitor hardware operative to monitor for presence of a portion of received wireless communications including a repetitive pattern. Depending on a magnitude of wireless energy (such as received signal strength) of the portion of received wireless communications including the repetitive pattern, communication management hardware of the wireless station controls transmission of wireless communications from the wireless station in the network environment. Thus, depending on a detected power level of the monitored wireless signals having a particular signature (such as repetitive pattern), the mobile communication device controls subsequent transmission of wireless communications from the mobile communication device in the network environment.

Now, with reference to the drawings, FIG. 1 is an example diagram illustrating monitoring of a network environment for wireless communications according to embodiments herein.

As shown in this example embodiment, wireless network environment 100 includes mobile communication device 110 (a.k.a., user equipment or wireless station) operated by user 108 as well as one or more wireless stations operated by other users.

In this example embodiment, the mobile communication device 110 (such as user equipment) includes communication manager 140, monitor resource 141, and corresponding one or more wireless interface (such as one or more antennas), supporting wireless communications with the wireless base station 160 or other wireless stations in network environment 100. The mobile communication device 160 further includes a display screen 130 operative to display images for viewing by the respective user 108 based on received data over a wireless communication link from the wireless base station 160.

As further shown, the wireless base station 160 includes communication manager 141 supporting communications with one or more other wireless stations in the network environment 100.

Note that the resources as described herein such as communication manager 145, communication manager 140, monitor resource 141, mobile communication device, wireless base station 160, etc., can be implemented via hardware, executed software, or a combination of hardware and executed software.

More specifically, communication manager 145 can be implemented as communication manager hardware, executed communication manager software, or a combination of communication manager hardware and executed communication manager software; communication manager 140 can be implemented as communication manager hardware, executed communication manager software, or a combination of communication manager hardware and executed communication manager software; monitor resource 141 can be implemented as monitor hardware, executed monitor software, or a combination of monitor hardware and executed monitor software; and so on. As further discussed below, the communication manager 145 initiates wireless communications from the wireless base station 160 to the mobile communication device 110 regarding which of one or more repetitive patterns, wireless communication protocols, etc., is to be monitored by the monitor resource 141.

As further discussed herein, certain embodiments include monitoring power levels or signal strengths of wireless communications transmitted in a network environment 100 using different wireless protocols. The detected power levels of different communications in the wireless network environment 100 can be used for any suitable reason such as controlling wireless communications from the mobile communication device 110 depending on one or more signal strength levels of wireless communications transmitted using the different wireless protocols.

Further in this example embodiment, wireless base station 160 (such as a gNodeB and corresponding resources) includes communication manager 145 supporting communications with one or more mobile communication devices (different instances of user equipment) in the network environment 100.

Note that the wireless stations (wireless base station 160, wireless base station 161, mobile communication device 110, etc.) in wireless network 100 can be configured to operate at any suitable carrier frequency or using any suitable wireless communication protocol.

For example, in one embodiment, the wireless base station 160 supports communications 170 via a first wireless communication protocol WP #1; the wireless station 111 supports communications via a second wireless communication protocol WP #2; the wireless station 112 supports communications via a third wireless communication protocol WP #3; the wireless station 161 supports communications via a fourth wireless communication protocol WP #4; and so on.

Note that any number of wireless stations in the wireless network environment 100 can be configured to wirelessly communicate using the same wireless protocol. For example, multiple wireless stations in the network environment 100 can be configured to wirelessly communicate using the first wireless communication protocol WP #1; multiple wireless stations in the network environment 100 can be configured to wirelessly communicate using the second wireless communication protocol WP #2; multiple wireless stations in the network environment 100 can be configured to wirelessly communicate using the third wireless communication protocol WP #3; and so on.

In such an instance, the power level of wireless communications in the network environment 100 for each of the wireless communication protocols may vary over time depending on amounts of usage of the wireless communication protocols by the wireless stations.

In one embodiment, the wireless stations communicate via one or more different wireless communication protocols (any suitable wireless communication protocol such as WiFi™, LTE (Long Term Evolution), LAA (Licensed Assisted Access), NRU, etc.) in the same or different bandwidth. In certain instances, the wireless stations share use of the same wireless bandwidth (such as one or more wireless channels) to convey communications to one or more intended recipient.

As further shown, the mobile communication device 110 can be configured to receive notification of an allocation of wireless channel resources (such as frequency and time domain information) via wireless resource allocation information 125 broadcasted from the wireless base station 160 or other suitable resource over a wireless medium.

In one example embodiment, the wireless resource allocation information 125 includes information facilitating communications from the mobile communication device 110 to the wireless base station 160 over a shared random access channel over which the mobile communication device 110 and other mobile communication devices in the network environment 100 potentially compete for use to communicate with the wireless base station 160 or other wireless base stations in network environment 100.

In yet further embodiments, the mobile communication device 110 uses the allocated resources as specified by the wireless resource allocation information 125 to request establishment of a wireless communication link over which to communicate data to the wireless base station.

Note that the wireless resource allocation information 125 can be configured to further include information such as frequency domain resources, time domain resources, etc., that are allocated for use by the mobile communication device 110 (or other mobile communication devices in the network environment 100) to communicate over a respective shared random access channel to the wireless base station 160.

Note that the shared wireless channel or bandwidth monitored by the monitor resource 141 can be used for any suitable purpose such as to request establishing of a wireless communication link for a data transfer between a mobile communication device and a wireless base station in the network environment 100. One reason for the mobile communication device 110 to request a wireless communication link is because the mobile communication device 110 has data in a buffer that needs to be transmitted to a destination in the remote network 190.

As further discussed below, the mobile communication device executes an enhanced listen before talk protocol to acquire rights in a shared wireless channel. For example, as further discussed below, via application of different settings and monitoring for the presence of different wireless signals/protocols using time domain repetition detection analyzer resources, embodiments herein support an enhanced listen before talk protocol to acquire use of a monitored shared wireless channel. More specifically, the mobile communication device 110 monitors a region for presence of one or more patterns to determine use of the wireless spectrum by other devices and corresponding used wireless communication protocols. Acquisition of the shared wireless channel by the mobile communication device 110 depends on whether the mobile communication device detects, via detected one or more repetitive patterns, communications transmitted via one or more wireless communication protocols and their corresponding signal strengths.

For example, in one embodiment, the monitor resource 141 of the mobile communication device 110 monitors for presence of one or more repetitive patterns in received wireless communications 199 (such as collection of communications 121, 122, 170, 171, etc.

For each repetitive pattern of interest, the monitor resource 141 produces a signal whose magnitude varies depending on a magnitude or signal strength of wireless energy of a portion of the received wireless communications including the repetitive pattern. Based on such detected information, the communication manager 140 then controls transmission of wireless communications (such as to establish a wireless communication link) from the mobile communication device 110 (wireless station) in the network environment 100 depending on magnitudes of the generated signals.

Subsequent to establishing a respective wireless communication link between the mobile communication device 110 and the wireless base station 160, the mobile communication device 110 is able to communicate through the wireless base station 160 to the remote network. Conversely, subsequent to establishing a respective wireless communication link between the mobile communication device 110 and the wireless base station 160, one or more server resources in the remote network 190 are able to communicate through the wireless base station 160 to the mobile communication device 110.

Figure 2:
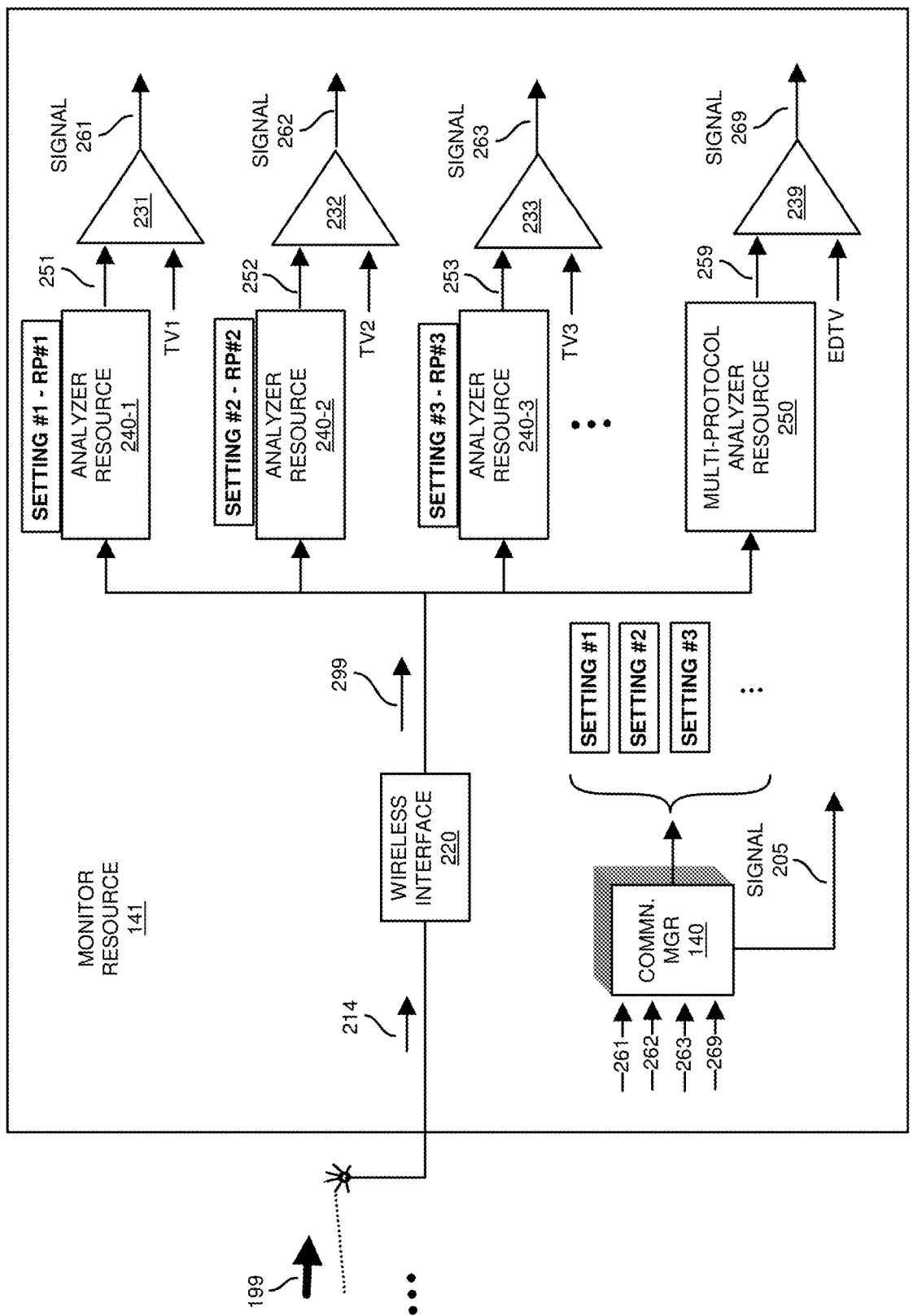
FIG. 2 is an example diagram illustrating details of a monitor resource according to embodiments herein.

FIG. 2 is an example diagram illustrating a monitor resource according to embodiments herein.

In this example embodiment, monitor resource 141 includes wireless interface 220 coupled to antenna device 214, analyzer resources 240 (such as analyzer resource 240-1, analyzer resource 240-2, analyzer resource 240-3, etc.), full bandwidth analyzer resource 250, comparator 231, comparator 232, comparator 233, comparator 234, etc.

During operation, a combination of the antenna 214 and wireless interface 220 converts the received wireless signal 199 (combination of detected signals 121, 122, 171, 172, etc.) into signal 299 transmitted to each of the analyzer resources 240-1, 240-2, 240-3, . . . , and 250.

In one embodiment, each of the analyzer resources 240 is an autocorrelator operative to analyze the received signal 299 (such as wireless signal 199 with the carrier frequency removed) for a respective repetitive pattern specified by the configuration settings (such as one of setting #1, setting #2, setting #3, . . . ) used to configure it. In one embodiment, an autocorrelator function (or autocorrelation) associated with an analyzer resource includes determining correlation between a received signal with a delayed copy of itself, where the delay may be defined in terms of samples of the received signal or a difference in the time reference of the delayed signal. In accordance with further embodiments, an autocorrelator operation or operations as described herein may be implemented as a sum of multiplication of samples of the signals or may be implemented as sum of the phases of the samples of the signals, etc.

Note that the communication manager 140 receives the settings associated with the analyzer resources from any suitable resource. In one embodiment, the communication manager 140 of communication device 110 receives the settings information (such as attributes associated with setting #1, setting #2, setting #3, . . . ) from the wireless base station 160. Accordingly, embodiments herein include, at the mobile communication device 110: receiving configuration setting information (such as settings #1, #2, #3, etc.) from a wireless base station 160.

As further shown, the communication manager 140 applies the configuration setting information (setting #1, setting #2, setting #3, . . . ) to respective analyzer resources 240 disposed in the mobile communication device 110 (wireless station).

As a more specific example, the communication manager 140 applies setting #1 to the analyzer resource 240-1. Application of settings #1 to the analyzer resource 240-1 configures the analyzer resource 240-1 (such as a first autocorrelator) to monitor the signal 299 for presence of a first repetitive pattern RP #1 received in the wireless signal 199; application of settings #2 to the analyzer resource 240-2 configures the analyzer resource 240-2 (such as a second autocorrelator) to monitor the signal 299 for presence of a second repetitive pattern RP #2 received in the wireless signal 199; application of settings #3 to the analyzer resource 240-3 configures the analyzer resource 240-3 (such as a third autocorrelator) to monitor the signal 299 for presence of a third repetitive pattern RP #3 received in the wireless signal 199; and so on.

Accordingly, embodiments herein include, at the mobile communication device 110: applying the configuration setting information (setting #1, setting #2, setting #3, etc., to a monitor resource 141 (such as hardware/software) disposed in the mobile communication device 110. In such an instance, the monitor resource 141 monitors for presence of the first repetitive pattern RP #1 as indicated by the setting #1; the monitor resource 141 monitors for presence of the second repetitive pattern RP #2 as indicated by the setting #2; the monitor resource 141 monitors for presence of the third repetitive pattern RP #3 as indicated by the setting #3; and so on.

In accordance with further embodiments, the output of each analyzer resource indicates an amount of energy, power level, signal strength, etc., associated with symbols in the signal 299 including the detected repetitive pattern. For example, based on monitoring the signal 299 (and thus wireless signal 199), the analyzer resource 240-1 implements a first time domain repetition detection analysis and produces signal 251, a magnitude of which indicates energy associated with a portion of the wireless signal 199 including the first repetitive pattern RP #1. Accordingly, embodiments herein include the analyzer resource 240-1 and comparator 231 producing a first signal 261 whose magnitude varies depending on a strength of wireless communications in the wireless signal 199 including the first repetitive pattern RP #1.

Based on monitoring the signal 299 (and thus wireless signal 199), the analyzer resource 240-2 implements a second time domain repetition detection analysis and produces signal 252, a magnitude of which indicates energy associated with a corresponding portion of the wireless signal 199 including the second repetitive pattern RP #2. Accordingly, embodiments herein include, via analyzer resource 240-2 and comparator 232, producing a second signal 262 whose magnitude varies depending on a strength of wireless communications in the wireless signal 199 including the second repetitive pattern RP #2.

Based on monitoring the signal 299 (and thus wireless signal 199), the analyzer resource 240-3 implements a third time domain repetition detection analysis and produces signal 253, a magnitude of which indicates energy associated with a portion of the wireless signal 199 including the first repetitive pattern RP #3; and so on. Accordingly, embodiments herein include, via analyzer resource 240-3 and comparator 233, producing a third signal 263 whose magnitude varies depending on a strength of wireless communications in the wireless signal 199 including the third repetitive pattern RP #3.

Note that the monitor resource 141 can be configured to none or more (such as zero, one, two, three, four, etc.) of the analyzer resources to detect presence of corresponding repetitive patterns as specified by the received settings.

As further shown, the monitor resource 140 includes the full bandwidth analyzer resource 250. As its name suggests, the analyzer resource 250 measures a strength of all signals and all protocol of communications present in the received wireless signal 199. In other words, the analyzer resource 250 monitors wireless communications at all possible protocols. Thus, the signal 254 represents a general amount of energy or signal strength associated with all wireless communications received in a corresponding monitored particular bandwidth.

In one embodiment, each repetitive pattern corresponds to a different wireless protocol being monitored in the network environment 100.

For example, detection of the first repetitive pattern RP #1 in the signal 299 via the analyzer resource 240-1 indicates presence of first wireless communications in the wireless signal 199 transmitted by one or more wireless stations in network environment 100 in accordance with a corresponding first wireless communication protocol WP #1; detection of the second repetitive pattern RP #2 in signal 299 via the analyzer resource 240-2 indicates presence of second wireless communications in the wireless signal 199 transmitted by one or more wireless stations in the network environment 100 in accordance with a corresponding second wireless communication protocol WP #2; detection of the third repetitive pattern RP #3 in the signal 299 via the analyzer resource 240-3 indicates presence of third wireless communications in the wireless signal 199 transmitted by one or more wireless stations in the network environment 100 in accordance with a corresponding third wireless communication protocol WP #3; and so on.

As further shown, monitor resource 141 includes comparator 231. Comparator 231 compares a magnitude of the signal 251 to the threshold value, TV1. The output of the comparator 231 indicates whether the magnitude of the signal 251 is above or below the threshold value TV1.

Monitor resource 141 further includes comparator 232. Comparator 232 compares a magnitude of the signal 252 to the threshold value TV2. The output of the comparator 232 indicates whether the magnitude of the signal 252 is above or below the threshold value TV2.

Monitor resource 141 further includes comparator 233. Comparator 233 compares a magnitude of the signal 253 to the threshold value TV3. The output of the comparator 233 indicates whether the magnitude of the signal 253 is above or below the threshold value TV3.

Note that the magnitude of the threshold values can be set to any suitable values.

Also, as further discussed herein, note that one purpose of comparing the output signals of the analyzer resources 240 to respective threshold values is to control, whether the mobile communication device 110 is allowed to acquire use of the corresponding monitored bandwidth. In contrast to conventional listen before talk techniques, embodiments herein include: i) monitoring a signal strength of one or more communications including one or more repetitive patterns indicating use of one or more particular wireless communication protocols in the network environment 100; and ii) controlling wireless communications depending on a magnitude of the different detected wireless communications.

For example, the communication manager 140 can be configured to prevent transmission of the wireless communications from the mobile communication device 110 in response to detecting that the magnitude of the first signal 251 is greater than the first threshold value TV1; the communication manager 140 can be configured to prevent transmission of the wireless communications from the mobile communication device 110 in response to detecting that the magnitude of the second signal 252 is greater than the second threshold value TV2; and so on.

Thus, embodiments herein include controlling transmission of the wireless communications from the mobile communication device 110 depending on magnitudes of the signals 251, 252, 253, etc. In one embodiment, based on the results of one or more signals 261, 262, 263, 269, etc., the communication manager 140 produces control signal 205 indicating whether the mobile communication device 110 is able to use the shared wireless channel monitored by the monitor resource 140.

Via monitoring and detection of different wireless protocols implemented in the network environment 100, such as indicated by signal 261 (which indicates whether the analyzed wireless signal 199 includes wireless communications associated with a first wireless communication protocol WP #1), such as indicated by signal 262 (which indicates whether the analyzed wireless signal 199 includes wireless communications associated with a second wireless communication protocol WP #2), such as indicated by signal 263 (which indicates whether the analyzed wireless signal 199 includes wireless communications associated with a third wireless communication protocol WP #3), etc., the communication manager 140 controls whether the mobile communication device 110 is able communicate in the network environment 100.

For example, if communication devices implementing wireless communication protocol WP #2 have a higher priority use of the shared wireless channel than wireless stations communicating in accordance with the wireless communication protocol WP #1, the monitor resource 140 can be configured to monitor the wireless signal 199 for wireless communications transmitted in accordance with the wireless communication protocol WP #2 by applying appropriate setting #2 to the analyzer resource 240-2. If the signal 252 is above a threshold value TV2, the communication manager 140 produces the control signal 262 to prevent the mobile communication device 110 from communicating in accordance with wireless communication protocol WP #1.

Conversely, if the signal 252 is below a threshold value TV2, the communication manager 140 produces the control signal 262 to allow the mobile communication device 110 to acquire the shared wireless channel and communicate via the first wireless communication protocol WP #1.

Accordingly, via application of different settings and monitoring for the presence of different wireless signals/protocols, embodiments herein support an enhanced listen before talk protocol to acquire use of a monitored shared wireless channel. Acquisition of the shared wireless channel by the mobile communication device 110 depends on wireless communication protocols associated with the wireless communications.

Figure 3:
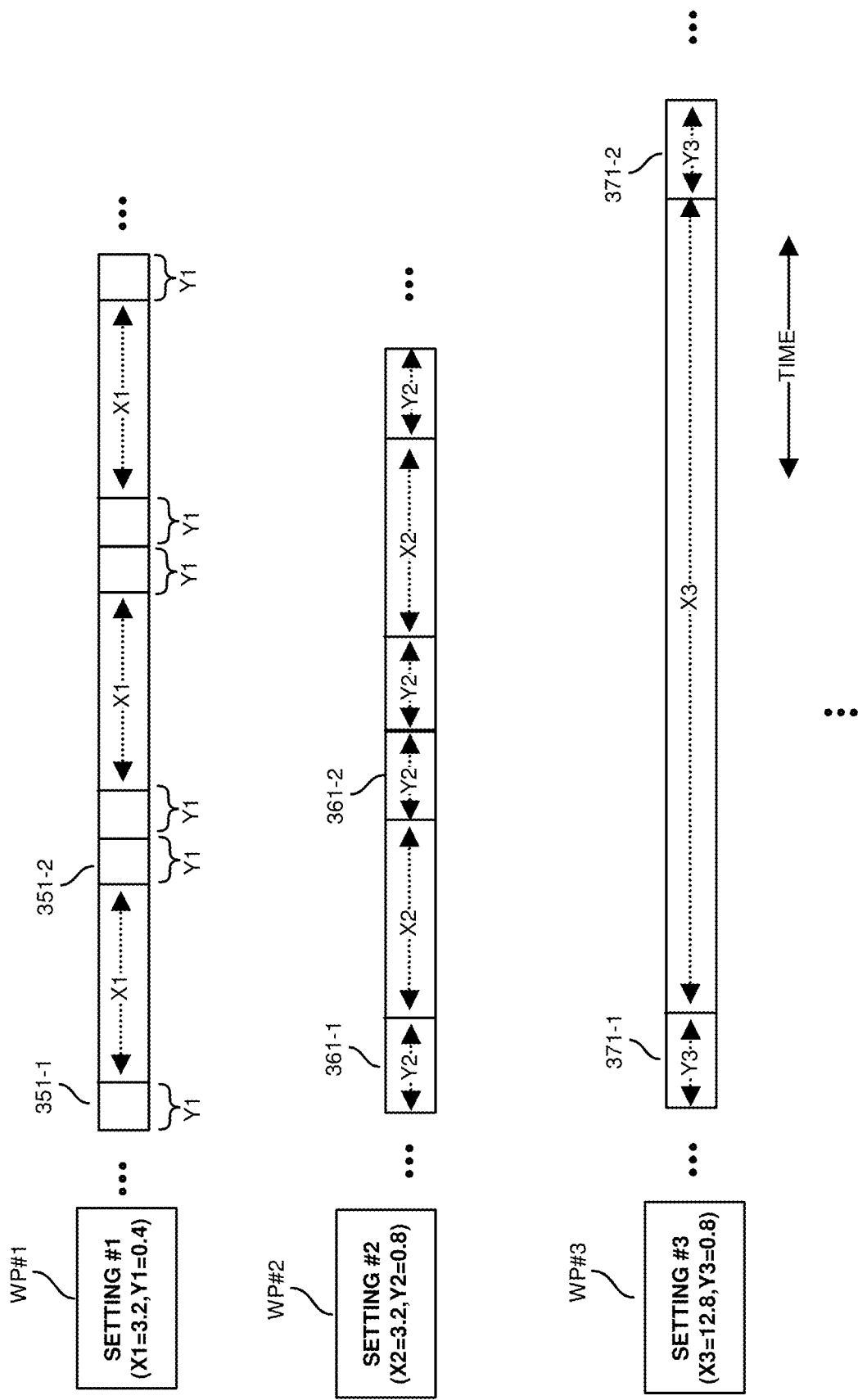
FIG. 3 is an example diagram illustrating application of settings to monitor for signatures (repetitive patterns) associated with multiple different wireless protocols according to embodiments herein.

FIG. 3 is an example diagram illustrating application of settings to monitor for multiple different wireless protocols according to embodiments herein.

In this example embodiment, each of the received settings (setting #1, setting #2, etc.) include timing information associated with the repetitive patterns to be monitored.

For example, in one embodiment, communication manager 140 receives setting #1, setting #2, setting #3, etc. Each of the settings include timing attributes indicating a time difference value (such as width of a symbol) in which to monitor for presence of respective repetitive patterns in the received wireless communications 199. As further discussed herein, each setting can indicate a duration of a respective repetitive pattern.

Note that the one or more monitored repetitive patterns can be located at the beginning of a wireless communication, middle of a wireless communication, or at the end of a wireless communication. Additionally, or alternatively, the one or more repetitive patterns being monitored can be located at both the beginning and end of a respective wireless communication (such as symbol, data packet, etc.).

Further in this example embodiment, setting #1 corresponds to a first wireless communication protocol WP #1 and indicates a symbol duration X1 associated with the wireless communication protocol WP #1 as being 3.2 microseconds; the setting #1 further indicates (via Y1) a cyclic prefix (repetitive pattern) of 0.4 microseconds associated with wireless communication protocol WP #1.

Application of the setting #1 to the analyzer resource 240-1 (time domain repetition detection analyzer) configures the analyzer resource 240-1 to search for any wireless communications in the wireless signal 199 that include a repetitive pattern RP #1 (such as cyclic prefix in the Y1 duration) based on a detecting a first instance 351-1 of the repetitive pattern (in duration Y1) and a second instance 351-2 of the repetitive pattern delayed by the time difference value X1=3.2 microseconds. Thus, via application of setting #1, the analyzer resource 240-1 is configured to identify a portion of the received wireless communications 199 including multiple instances of the repetitive pattern RP #1 associated with wireless communication protocol WP #1 based on a time difference X1 between a first instance 351-1 of the repetitive pattern and a second instance 351-2 of the repetitive pattern in the received wireless communications.

Further in this example embodiment, setting #2 corresponds to a second wireless communication protocol WP #2 and indicates a symbol duration X2 associated with the wireless communication protocol WP #2 as being 3.2 microseconds; the setting #2 further indicates (via Y2) a cyclic prefix (repetitive pattern) of 0.8 microseconds associated with wireless communication protocol WP #2.

Application of the setting #2 to the analyzer resource 240-2 (time domain repetition detection analyzer) configures the analyzer resource 240-2 to search for any wireless communications in the wireless signal 199 that include a repetitive pattern RP #2 (such as cyclic prefix in the Y2 duration) based on a detecting a first instance 361-1 of the repetitive pattern (in duration Y2) and a second instance 361-2 of the repetitive pattern delayed by the time difference value X1=3.2 microseconds. Thus, via application of setting #2, the analyzer resource 240-2 is configured to identify a portion of the received wireless communications 199 including multiple instances of the repetitive pattern RP #2 associated with wireless communication protocol WP #2 based on a time difference X2 between a first instance 361-1 of the repetitive pattern RP #2 and a second instance 361-2 of the repetitive pattern RP #2 in the received wireless communications.

Yet further in this example embodiment, setting #3 corresponds to a third wireless communication protocol WP #3 and indicates a symbol duration X3 associated with the wireless communication protocol WP #3 as being 12.8 microseconds; the setting #3 further indicates (via Y3) a cyclic prefix (repetitive pattern) of 0.8 microseconds associated with wireless communication protocol WP #3.

Application of the setting #3 to the analyzer resource 240-3 (time domain repetition detection analyzer) configures the analyzer resource 240-3 to search for any wireless communications in the wireless signal 199 that include a repetitive pattern RP #3 (such as cyclic prefix in the Y3 duration) based on a detecting a first instance 371-1 of the repetitive pattern (in duration Y3) and a second instance 371-2 of the repetitive pattern delayed by the time difference value X3=12.8 microseconds. Thus, via application of setting #3, the analyzer resource 240-3 is configured to identify a portion of the received wireless communications 199 including multiple instances of the repetitive pattern RP #3 associated with wireless communication protocol WP #3 based on a time difference X3 between a first instance 371-1 of the repetitive pattern RP #3 and a second instance 371-2 of the repetitive pattern RP #3 in the received wireless communications.

Figure 4:
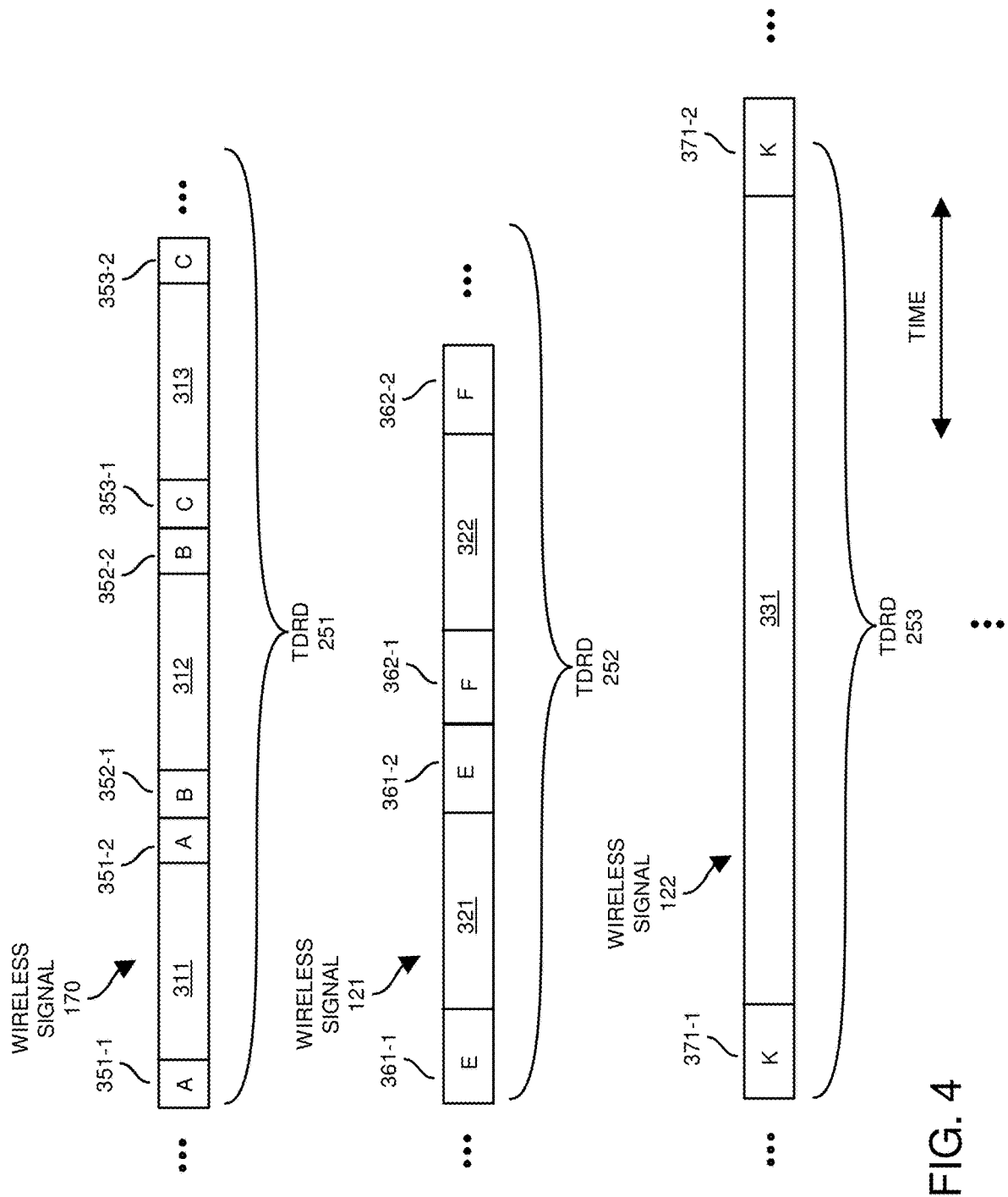
FIG. 4 is an example diagram illustrating monitoring for presence of repetitive patterns in a network environment and resulting detection of different wireless communications according to embodiments herein.

FIG. 4 is an example diagram illustrating detection of different wireless communications according to embodiments herein.

In this example embodiment, assume that the wireless base station 160 transmits the wireless communication 170 via wireless communication protocol WP #1. As previously discussed, analyzer resource 240-1 is configured to monitor received wireless signal 199 including wireless communications such as wireless communication 170 transmitted in accordance with the wireless communication protocol WP #1.

The analyzer resource 240-1 implements setting #1 and, based on corresponding timing associated with setting #1, detects first instance 351-1 of repetitive pattern A and second instance 351-2 of repetitive pattern A associated with symbol 311 in wireless signal 170 present in signal 299. Additionally, based on setting #1, the analyzer resource 240-1 detects first instance 352-1 of repetitive pattern B and second instance 352-2 of repetitive pattern B associated with symbol 312 in wireless signal 170, and so on. The analyzer resource 240-1 produces (Time Domain Repetition Detection) signal 251 based on a predetermined number (L) of detected repetitions of the expected pattern in wireless signal 170.

Further in this example embodiment, assume that the wireless station 111 transmits the wireless communication 121 via wireless communication protocol WP #2. As previously discussed, analyzer resource 240-2 is configured to monitor received wireless signal 199 including wireless communications transmitted in accordance with the wireless communication protocol WP #2.

The analyzer resource 240-2 implements setting #2 and, based on corresponding timing associated with setting #2, detects first instance 361-1 of repetitive pattern E and second instance 361-2 of repetitive pattern E associated with symbol 321 in wireless signal 121. Additionally, based on setting #2, the analyzer resource 240-2 detects first instance 362-1 of repetitive pattern F and second instance 362-2 of repetitive pattern F associated with symbol 322 in wireless signal 121, and so on. The analyzer resource 240-2 produces (TDRD) signal 252 based on a predetermined number (L) of detected repetitions of the expected pattern in wireless signal 121.

Further in this example embodiment, assume that the wireless station 112 transmits the wireless communication 122 via wireless communication protocol WP #2. As previously discussed, analyzer resource 240-3 is configured to monitor received wireless signal 199 including wireless communications transmitted in accordance with the wireless communication protocol WP #3.

The analyzer resource 240-3 implements setting #3 and, based on corresponding timing associated with setting #3, detects first instance 371-1 of repetitive pattern K and second instance 371-2 of repetitive pattern K associated with symbol 331 in wireless signal 122. The analyzer resource 240-3 produces (TDRD) signal 253 based on a predetermined number (L) of detected symbols in wireless signal 122.

Referring again to FIG. 2, in one embodiment, the monitor resource 140 of the mobile communication device 110 (such as NRU user equipment) performs a combination of Energy-Detect (ED) implemented by the analyzer resource 250 and time-domain repetition detection (TDRD) implemented by each of the analyzer resources 240 to produce respective signals 251, 252, 253, etc.

Embodiment 1

In a first case, the monitor resource 140 of the mobile communication device 110 (user equipment) performs time-domain repetition detection (a.k.a., TDRD) analysis for (OS, CP) and the detected energy for L consecutive repetitions of the expected pattern is denoted as TDRD(OS,CP,L) in which OS=a duration of an Orthogonal Frequency Division Multiplex symbol of the expected technology, CP=a duration of a Cyclic Prefix or the expected technology (where OS and CP constitute a pattern as shown in FIG. 4), and L=a predetermined number of repetitions of the expected pattern. Values OS, CP, and L and presented as time durations.

As previously discussed, TDRD output signals (such as signals 251, 252, 253, etc.) outputted form the analyzer resources 240 represents the energy (or signal strength detection) resulting from autocorrelation of samples of the received signal with previous samples (where the samples are temporally apart by the value of OS) across as many samples as the duration of CP. The resulting (such as captured by the signals 251, 252, 253-3, etc.) energy is moving-averaged across L symbols (OS).

In one embodiment, the set of (OS,CP) is one of several of the following:
a) setting #1=(OS duration=3.2 µs, CP duration=0.4 µs) and setting #2=(3.2 µs, 0.8 µs): 11ac with short/normal GI
b) setting #3=(12.8 µs, 0.8 µs), setting #4=(12.8 µs, 1.6 µs) and setting #5=(12.8 µs, 3.2 µs): 11ax with short/normal/long GI In accordance with further embodiments, the communication manager 140 of the mobile communication device 110 considers the monitored shared wireless channel (wireless signal 199) to be busy (i.e., LBT fails) if the detected energy (signal 269, overall amount of energy detected in monitored bandwidth or channel) is larger than a first threshold (EDTV) or one of the following conditions is met: any of the observed TDRD(OS,CP,L) metrics such as signals 251, 252, 253, etc., generated by respective analyzer resources 240 is above a respective threshold value TV1, TV2, TV3, etc.

Note that, in further example embodiments, the wireless base station 160 configures the mobile communication device 110 (and any of one or more other mobile communication devices in the network environment 100) with one or multiple thresholds TV1, TV2, TV3, etc., associated with the TDRD processes as implemented by the analyzer resources 240.

In yet further embodiments, the wireless base station 160 configures the mobile communication device 110 to perform TDRD analysis (via one or more analyzer resources 240) for a subset of (OS,CP) settings listed above, e.g., if no 11ac devices expected (e.g. in 6 GHz), then TDRD for (3.2 µs, 0.4 µs) and (3.2 µs, 0.8 µs) is not performed. Or depending on deployment, only one of the (OS,CP) settings associated with 11ax is considered.

Also, note that the wireless base station 160 (gNB) may configure UEs (mobile communication devices) to report attributes of the detected RATs, e.g., to report RSSI and channel occupancy (CO) information for each of the (OS, CP) that the monitor resource 140 performs a TDRD analysis.

Embodiment 2

In this example embodiment, the mobile communication device 110 performs a combination of energy-detect (ED) via implementation of analyzer resource 250 and time-domain repetition detection (TDRD) implemented via one or more analyzer resources 240.

In addition to the previous (OS, CP)-tuples, the mobile communication device 110 performs TDRD analysis for the following ones and the detected energy for L consecutive symbols is denoted as TDRD(OS,CP,L):
setting #11=(66.7 µs, 4.69 µs), setting #12=(66.7 µs, 4.69 µs) and setting #13=(66.7 µs, 16.67 µs): LTE LAA with short/long CP
setting #14=(66.7 µs, 4.69 µs) and setting #15=(33.33 µs, 2.34 µs): NR-U with SCS=15/30 kHz and normal CP Note that, additional (OS,CP) analysis can be implemented via the monitor resource 140 to account for the other (OS,CP) settings associated with PRACH in LAA and/or NR.

In such an instance, the communication manager 140 considers the monitored shared wireless channel to be busy (i.e. LBT fails) if the detected energy as indicated by signal 259 is greater than a first threshold (EDTV) or one of the following conditions is met: any of the observed TDRD(OS, CP,L) metrics associated with setting #11, setting #12, setting #13, etc., is larger than a respective threshold value.

Note that the wireless base station 160 may configure the mobile communication device 110 to perform TDRD analysis for a subset of technologies, hence a subset of (OS,CP) tuples above. As an example, when considering indoor vs outdoor deployment, the wireless base station 160 may configure the mobile communication device 160 to perform TDRD analysis as described herein only for one of the (OS,CP) tuples (such as a specific wireless communication protocol) implemented by the mobile communication device 110. Also, the wireless base station 160 can be configured to configure one or more mobile communication devices 110 in the network environment 100 to report attributes of the detected RATs, e.g. to report RSSI and channel occupancy (CO) based for each of the (OS,CP) that the UE performs a TDRD process for Additionally, the wireless base station 160 may configure UEs with one or multiple thresholds associated with the TDRD processes, and the second thresholds (associated with 802.11, LAA, NR technologies) may have various different values in order to differentiate various levels of coexistence with 802.11, LAA and NR-U devices (hence varying level of trade-off of false alarm and miss detection for the receiver to detect each technology).

Embodiment 3

In yet further embodiments, the monitor resource 141 of the mobile communication device 110 performs a combination of energy-detect (ED) via analyzer resource 250 and time-domain repetition detection (TDRD) via one or more analyzer resources 240.

Applicable to all previous cases, the monitor resource 141 of the mobile communication device 110 can be configured to trigger a respective TDRD process (analysis via implementation of one or more analyzer resources 240) after one of multiple of the following events occur:

i) contention window size (CWS) associated with LBT Cat-4 for one or more channel access priority class (CAPC) increases due to, for example, prior one or more collisions, or passes a (CAPC-dependent threshold)

ii) the mobile communication device 110 experiences successive LBT failures as detected at MAC layer for one or more of the following at the UE side: RACH transmissions, scheduling request (SR) transmissions, PUSCH transmissions iii) TDRD processes via implementation of the one or more analyzer resources 240 may be triggered only before accessing the unlicensed channel with LBT Cat-2 where a gNB or UE performs a TDRD process for one or multiple (OS,CP) values associated with 802.11ac/ax, LAA or NR.

Embodiment 4

In accordance with further embodiments, a WiFi device, e.g. an 802.11ac or 802.11ax Access Point (AP) or Station (STA), performs a combination of energy-detect (ED) via implementation of analyzer resource 250 and time-domain repetition detection (TDRD) via implementation of one or more analyzer resources 240.

In one embodiment, a WiFi device (such as mobile communication device 110 or other device) performs TDRD with (OS, CP) and the detected energy for L consecutive symbols is denoted as TDRD(OS,CP,L), which is the energy resulting from autocorrelation of samples of the received signal with previous samples (where the samples are temporally apart by the value of OS) across as many samples as the duration of CP. The resulting energy as captured by a respective generated signal (from an analyzer resource) is moving-averaged across L symbols (OS). The (OS, CP)-tuples for the following ones and the detected energy for L consecutive symbols is denoted as TDRD(OS,CP,L):

(66.7 µs, 4.69 µs), (66.7 µs, 4.69 µs) and (66.7 µs, 16.67 µs): LTE LAA with short/long CP (66.7 µs, 4.69 µs) and (33.33 µs, 2.34 µs): NR-U with SCS=15/30 kHz and normal CP Additional (OS,CP) cases may be added to account for other the (OS,CP)s associated with PRACH in LAA and/or NR.

In one embodiment, the WiFi™ device (such as mobile communication device 110) considers the monitored channel to be busy (i.e. LBT or CCA fails) if the detected energy is larger than a first threshold or one of the following conditions is met: any of the observed TDRD(OS,CP,L) metrics such as signal 251, 252, 253, etc., is above a respective threshold value TV1, TV2, TV3, etc.

Figure 5:
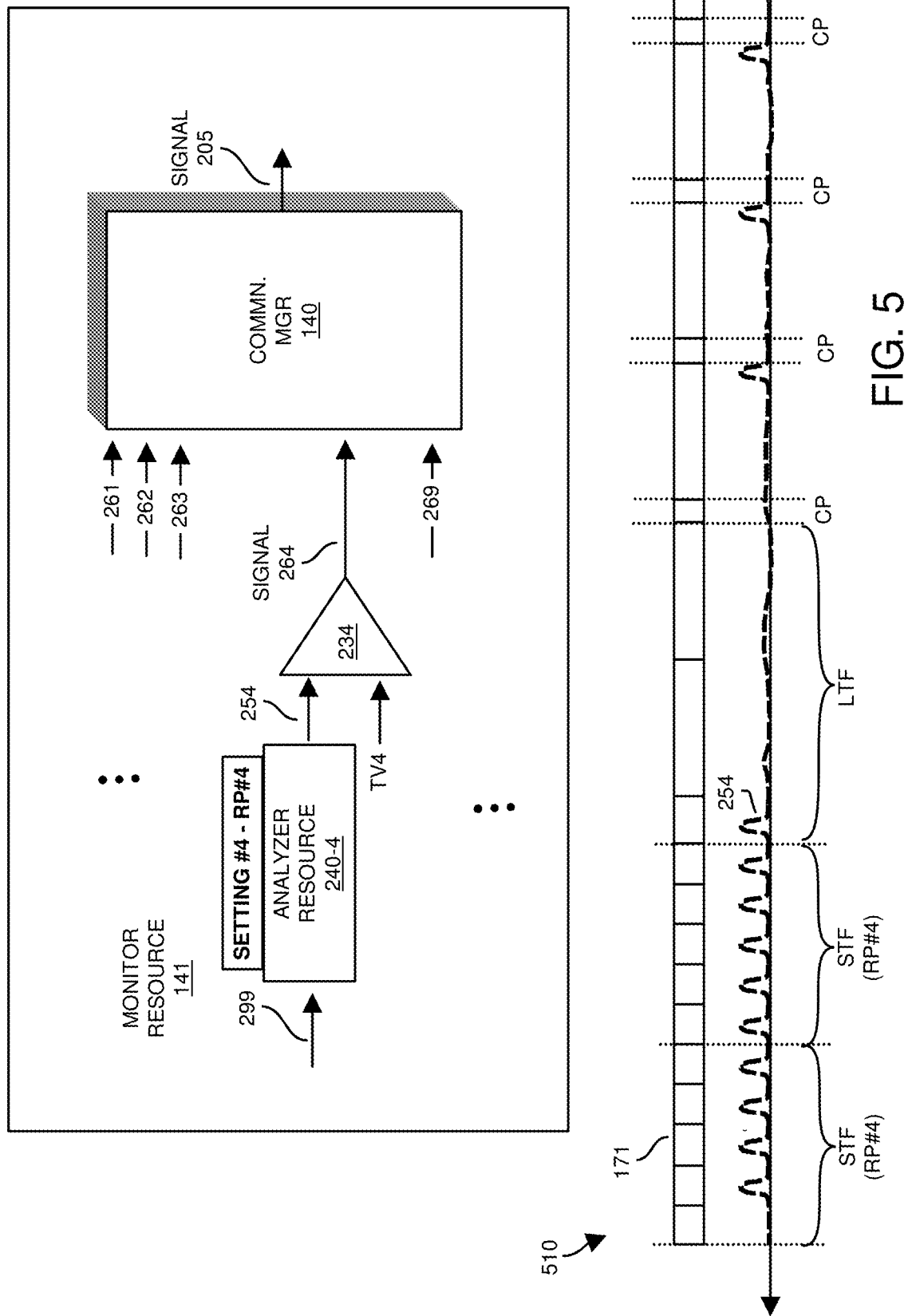
FIG. 5 is an example diagram illustrating monitoring of different repetitive patterns according to embodiments herein.

FIG. 5 is an example diagram illustrating monitoring of different repetitive patterns according to embodiments herein.

Note that further embodiments herein include monitoring for presence of a combination of one or more cyclic prefix patterns (first repetitive patterns) associated with transmitted symbols in received wireless communications as well as monitoring for presence of second repetitive patterns (such as one or more preambles or one or more portions of a preamble) in received wireless communications (such as a data packet).

More specifically, in one embodiment, the monitor resource 140 of the mobile communication device 110 (such as NRU user equipment) performs a combination of energy-detect (ED) via analyzer resource 250 and time-domain repetition detection (TDRD) via one or more analyzer resources 240.

In this example embodiment, as shown, the monitor resource 140 further includes analyzer resource 240-4 operative to monitor wireless communications (such as wireless communications 171) communicated in accordance with wireless communication protocol WP #4.

In one embodiment, the monitor resource 140 performs a TDRD analysis for the same (OS,CP) settings (setting #1, setting #2, setting #3) as previously discussed. Via analyzer resource 240-4 in this example, the mobile communication device 110 also performs TDRD analysis for detection of a repetitive pattern RP #4 such as an 802.11 L-STF signal; in such an instance, the detected energy as indicated by signal 264 as produced by the analyzer resource 240-4 for L consecutive repetitions of the expected pattern is denoted as TDRD(OS,STF,L).

In accordance with further embodiments, the mobile communication device 110 considers the monitored channel (on which wireless signal 199 is received) to be busy (i.e., LBT fails, and channel not granted to the monitoring device) if the detected energy as indicated by the analyzer resource 250 is larger than a first threshold (EDTV) or one of the following conditions is met:

i) any of the observed TDRD(OS,CP,L) metrics (such as signal 251, 252, 253, etc.) is larger than respective second thresholds (such as TV1, TV2, TV3, etc.);

ii) TDRD(OS,STF,L) metric such as signal 254 generated by the analyzer resource 240-4 is larger than threshold TV4;

iii) TDRD(OS,CP,L) metric such as one of signals 251, 252, 253, etc., increases above a second threshold after TDRD-STF metric (signal 264) indicates detection of 802.11 L-STF;

iv) in a similar manner as previously discussed, the wireless base station 160 can be configured to configure UEs with one or multiple threshold values (such as TV1, TV2, TV3, TV4, etc.) associated with the TDRD processes implemented by analyzer resources 240; or v) the wireless base station 160 may configure the mobile communication device 110 to perform TDRD analysis (via analyzer resource 240-4) for repetitive pattern RP #4 such as STF only (without implementing analyzer resource 240-1, 240-2, and 240-3), in which case the mobile communication device 110 would be able to detect the start of a 802.11 physical frame.

Similar to the previous cases, note that the wireless base station 160 can be configured to restrict the mobile communication device 110 to perform TDRD analysis (such as via the analyzer resources 240) for a subset of the (OS,CP) pairs listed above. In other words, any combination of one or more of the analyzer resources 240 can be instantiated to monitor the wireless signal 199.

In one embodiment, the structure of a received 802.11 physical frame in the time-domain is shown in timing diagram 510 in FIG. 5, which starts with repetitive pattern RP #4 such as one or more STF symbols or portions of the time-domain representation of DTF. Each 802.11 STF symbol consists of multiple identical segments five identical segments per STF symbol in the case of 802.11a preamble, (due to its frequency-domain structure). Any of the observed TDRD(OS,CP,L) metrics is larger than a second threshold.

In one example embodiment, a combination of TDRD (OS,STF,L) analysis and TDRD(OS,CP,L) analysis and respective generated metrics are calculated via respective analyzer resources 240 and compared to associated thresholds as previously discussed to determine whether the mobile communication device 110 is able to communicate over a respective shared wireless channel.

Further, as previously discussed, in one embodiment, the communication manager 140 generates the control signal 205 indicating whether the communication manager 140 of the mobile communication device 110 is able to proceed with use of a shared wireless channel monitored by the monitor resource 141.

Given 802.11 frame structure, when both TDRD(OS,STF, LL) and TDRD(OS,CP,L) processes as implemented by analyzer resources 240 are executing, reception of an 802.11 frame first causes the metric (signal 264) associated with TDRD(OS,STF,L) to spike in magnitude (indicating detection of a respective preamble pattern/symbol in the received wireless communication 199) and then the metric (such as signal 261, 262, 263, etc.) associated with a TDRD(OS,CP, L) analysis spikes in magnitude (indicating detection of a cyclic prefix and/or corresponding symbol in the received wireless communications 199). Given the structure of 802.11 frames, the receiver in FIG. 5 (with the detectors 261, 262, 263, 264) would first only detects the repetition pattern of preamble or STF, via TDRD(OS,STF,LL), where upon such event the it is more certain that one of the other detectors 261, 262, and 263 would spike after a deterministic duration. Communication manager 140 may take this behavior into account to identify a specific communication protocol after above sequence of spikes from 264 followed by one or more of 261, 262 and 263. Thus, a combination of detecting the increased magnitude of signal 254 via analyzer resource 240-4 indicating detection of repetitive pattern #4 followed by detection of the increased magnitude of another signal such as signal 251 via analyzer resource 240-1 indicating detection of repetitive pattern #1 indicates a particular wireless communication protocol such as communication 171 as shown in the timing diagram 510.

Figure 6:
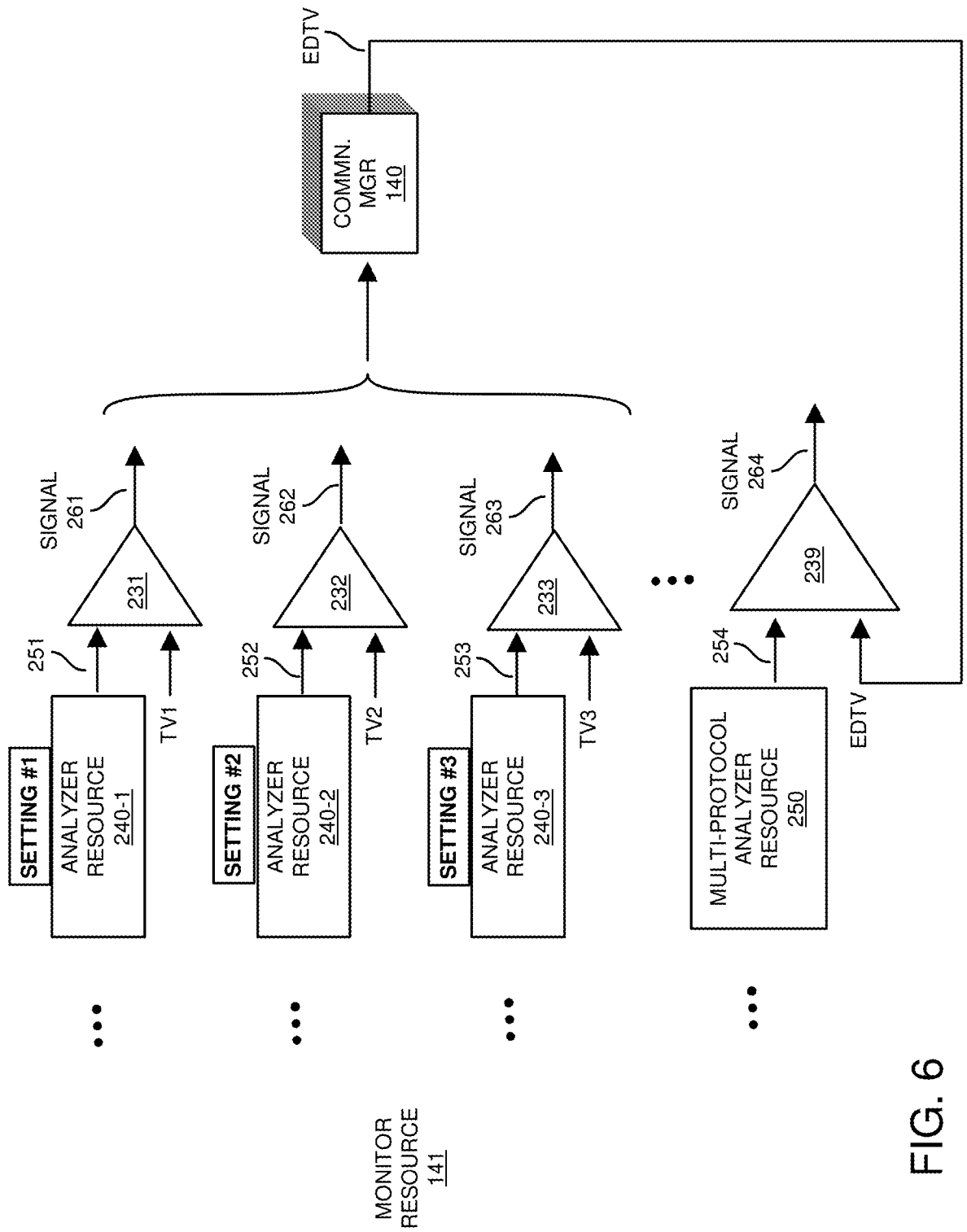
FIG. 6 is an example diagram illustrating modification of a general threshold value depending on detected types of wireless communications in a network environment according to embodiments herein.

FIG. 6 is an example diagram illustrating modification of a threshold value depending on detected types of wireless communications in a network environment according to embodiments herein.

In this example embodiment, the mobile communication device 110 (such as NR UE) implements analyzer resources 240, which are selectively configured to perform a Time-Domain Repetition Detection (TDRD) analysis as previously discussed.

In one embodiment, based on the results of monitoring the wireless signal for one or more repetitive patterns, the communication manager 140 adjusts its EDTV threshold value accordingly. More specifically, embodiments herein include, via the communication manager 140, adjusting a threshold value EDTV depending on the magnitude of one or more signals 251, 252, 253, etc.; and comparing a signal strength of the received wireless communications to the adjusted EDTV threshold value.

More specifically, in one embodiment, the mobile communication device 110 performs TDRD as previously discussed for (OS, CP) and the detected energy for L consecutive symbols is denoted as TDRD(OS,CP,L). The setting for (OS,CP) is one or several of the following:

a.) repetitive pattern RP #1 setting #1=(3.2 μs, 0.4 μs) and repetitive pattern RP #2 setting #2=(3.2 μs, 0.8 μs): 11ac with short/normal CP or guard interval (GI);

b.) repetitive pattern RP #3 setting #3=(12.8 μs, 0.8 μs), repetitive pattern RP #4 setting #4=(12.8 μs, 1.6 μs) and repetitive pattern RP #5 setting #5=(12.8 μs, 3.2 μs): 11ax with short/normal/long GI;

c.) repetitive pattern RP #6 (66.7 μs, 4.69 μs), repetitive pattern RP #7 (66.7 μs, 4.69 μs) and repetitive pattern RP #8 (66.7 μs, 16.67 μs): LTE LAA with short/long CP d.) repetitive pattern RP #9 (66.7 μs, 4.69 μs) and repetitive pattern RP #10 (33.33 μs, 2.34 μs): NR-U with SCS=15/ 30 kHz and normal CP Additionally, via the analyzer resources 240, the mobile communication device 110 performs TDRD analysis for detection of 802.11 L-STF signal and the detected energy for a L consecutive symbols is denoted as TDRD(OS,STF,L).

Upon detection CP for one or multiple of (OS,CP) tuples, the communication manager 140 of the mobile communication device 110 adjusts the associated threshold EDTV for the ED procedure. The ED threshold adjustment may depend on the type of detected (OS,CP) tuple.

Upon detection of multiple instances of repetitive pattern (associated with 802.11 L-STF) during a configured interval, the communication manager 140 adjusts the associated threshold value EDTV for a respective ED procedure. For example, in response to detecting presence of wireless communications transmitted in accordance with one or more wireless protocols via implementation of analyzer resources 240, the communication manager 140 adjusts a magnitude of the EDTV threshold value at least temporarily from EDTV1 to EDTV2.

Figure 7:
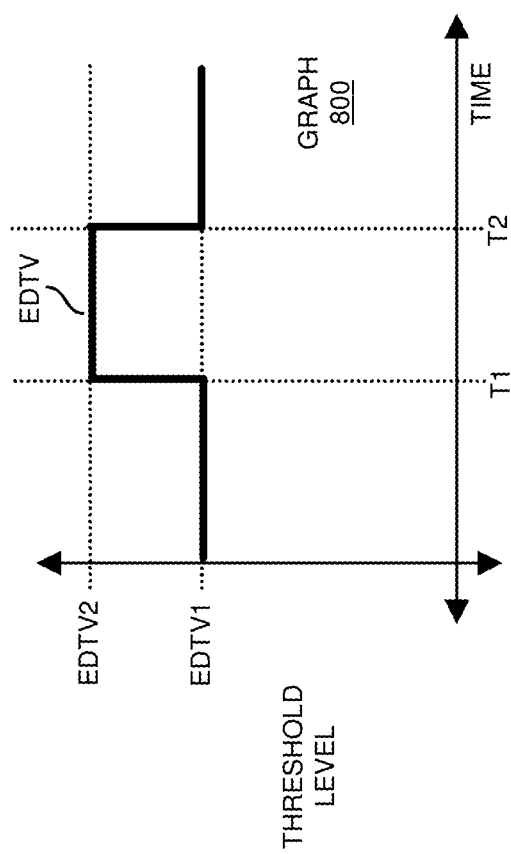
FIG. 7 is an example diagram illustrating variations of a general threshold value over time according to embodiments herein.

As shown in the example embodiment of FIG. 7, the adjusted ED threshold value (EDTV2) remains in effect for a configured duration of time (such as between time T1 and time T2) and upon a new detection of a particular one or more repetitive patterns (such as CP and/or 802.11 L-STF), the configured duration starts anew and is in effect for the configured duration of time.

In one embodiment, the wireless base station 160 (such as gNB) may perform TDRD analysis via each of analyzer resources 240 and upon a number of occurrences of repetitive patterns such as CP and/or 802.11 L-STF, the wireless base station 160 (gNB) indicates new ED threshold (or thresholds) to mobile communication device (user equipment or UEs) that is expected to remain in effect for one or multiple consecutive COTs or for a configured time duration.

Figure 8:
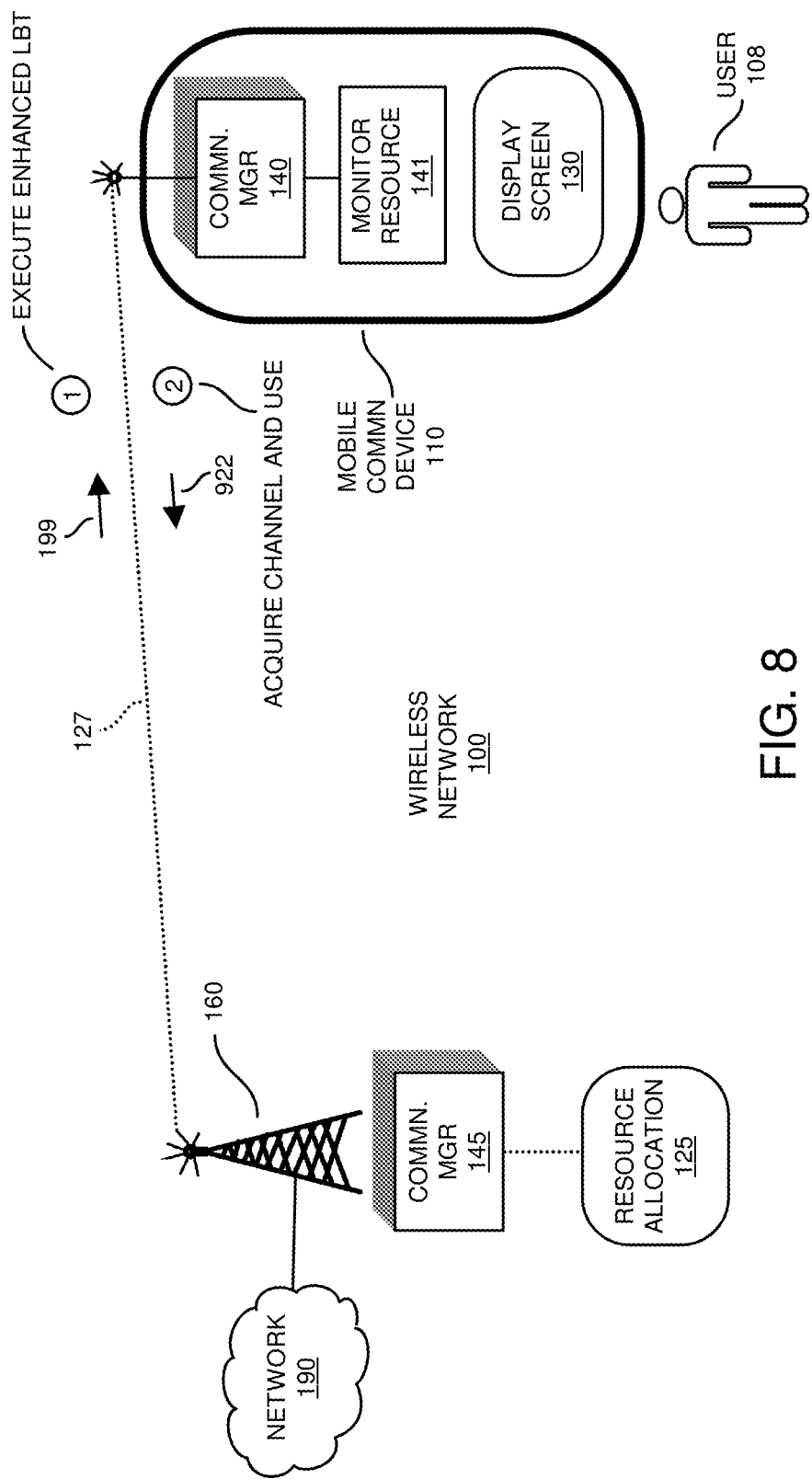
FIG. 8 is an example diagram illustrating implementation of listen before talk procedure as well as use of an acquired shared channel according to embodiments herein.

FIG. 8 is an example diagram illustrating implementation of an enhanced listen before talk procedure as well as use of an acquired shared channel according to embodiments herein.

As previously discussed, in operation #1, the mobile communication device 110 implements a listen before talk procedure as previously discussed to monitor wireless signal 199 and determines availability of a shared wireless channel as monitored by the monitor resource 140.

In operation #2, after determining that shared wireless channel is generally free from use (not used) by other wireless stations in network environment 100, the mobile communication device 110 acquires the shared wireless channel and uses the channel for a respective channel occupancy time. During the respective channel occupancy time, the mobile communication device 110 communicates a message such as request to establish a wireless communication link to the wireless base station 160.

Figure 9:
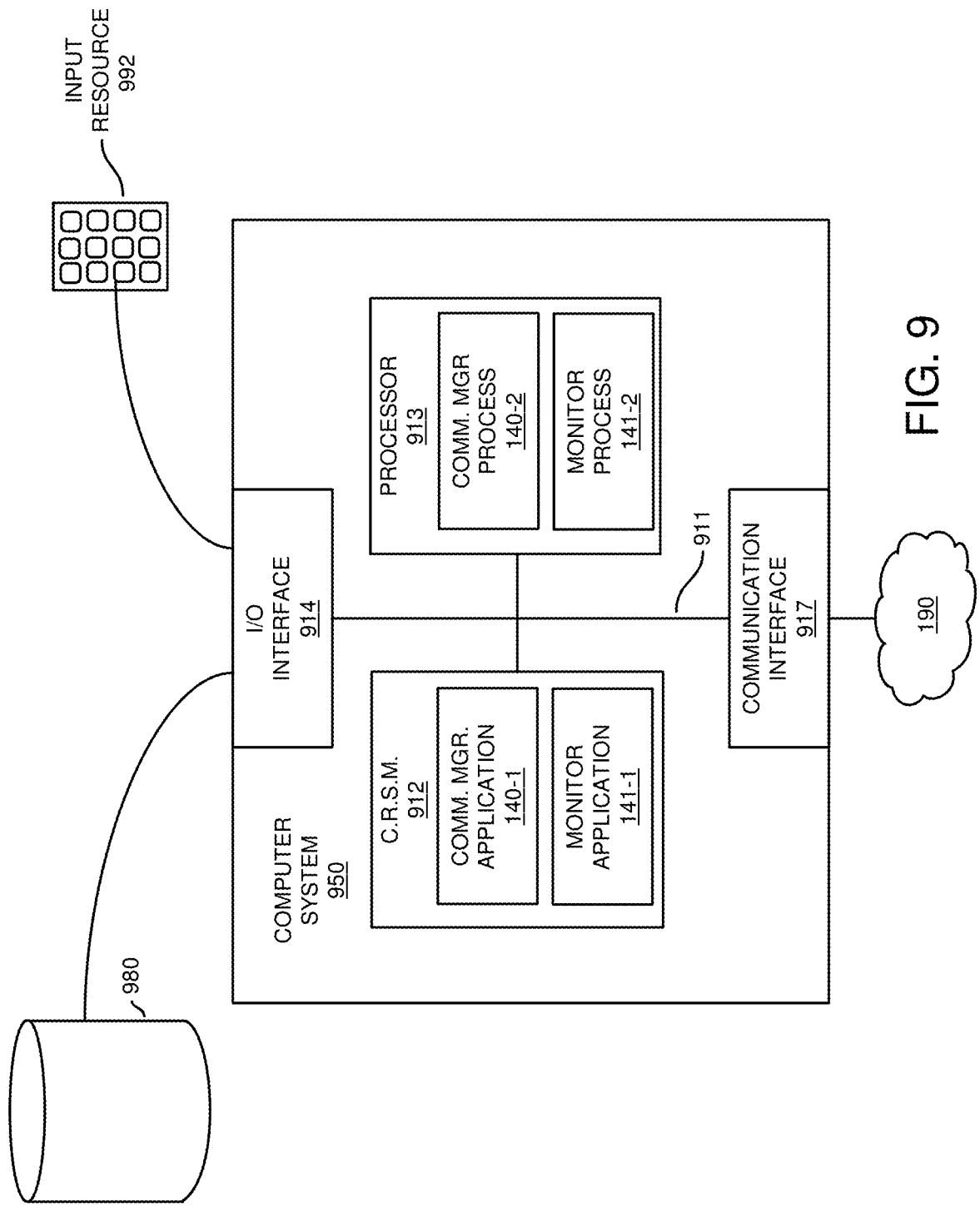
FIG. 9 is an example diagram illustrating example computer hardware and software operable to execute one or more operations according to embodiments herein.

FIG. 9 is an example block diagram of a computer system for implementing any of the operations as previously discussed according to embodiments herein.

Any of the resources (such as communication manager 140, communication manager 141, mobile communication device 110, wireless base station 160, analyzer resource 240, analyzer resource 250, comparator, etc.) as discussed herein can be configured to include computer processor hardware and/or corresponding executable instructions to carry out the different operations as discussed herein.

As shown, computer system 950 of the present example includes interconnect 911 coupling computer readable storage media 912 such as a non-transitory type of media (which can be any suitable type of hardware storage medium in which digital information can be stored and or retrieved), a processor 913 (computer processor hardware), I/O interface 914, and a communications interface 917.

I/O interface(s) 914 supports connectivity to repository 980 and input resource 992.

Computer readable storage medium 912 can be any hardware storage device such as memory, optical storage, hard drive, floppy disk, etc. In one embodiment, the computer readable storage medium 912 stores instructions and/or data.

As shown, computer readable storage media 912 can be encoded with communication manager application 140-1 (e.g., including instructions) in a respective wireless station to carry out any of the operations as discussed herein.

During operation of one embodiment, processor 913 accesses computer readable storage media 912 via the use of interconnect 911 in order to launch, run, execute, interpret or otherwise perform the instructions in communication manager application 140-1 stored on computer readable storage medium 912. Execution of the communication manager application 140-1 produces communication manager process 140-2 to carry out any of the operations and/or processes as discussed herein.

Those skilled in the art will understand that the computer system 950 can include other processes and/or software and hardware components, such as an operating system that controls allocation and use of hardware resources to execute communication manager application 140-1.

In accordance with different embodiments, note that computer system may reside in any of various types of devices, including, but not limited to, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 950 may reside at any location or can be included in any suitable resource in any network environment to implement functionality as discussed herein.

Functionality supported by the different resources will now be discussed via the flowchart in FIG. 10. Note that the steps in the flowcharts below can be executed in any suitable order.

Figure 10:
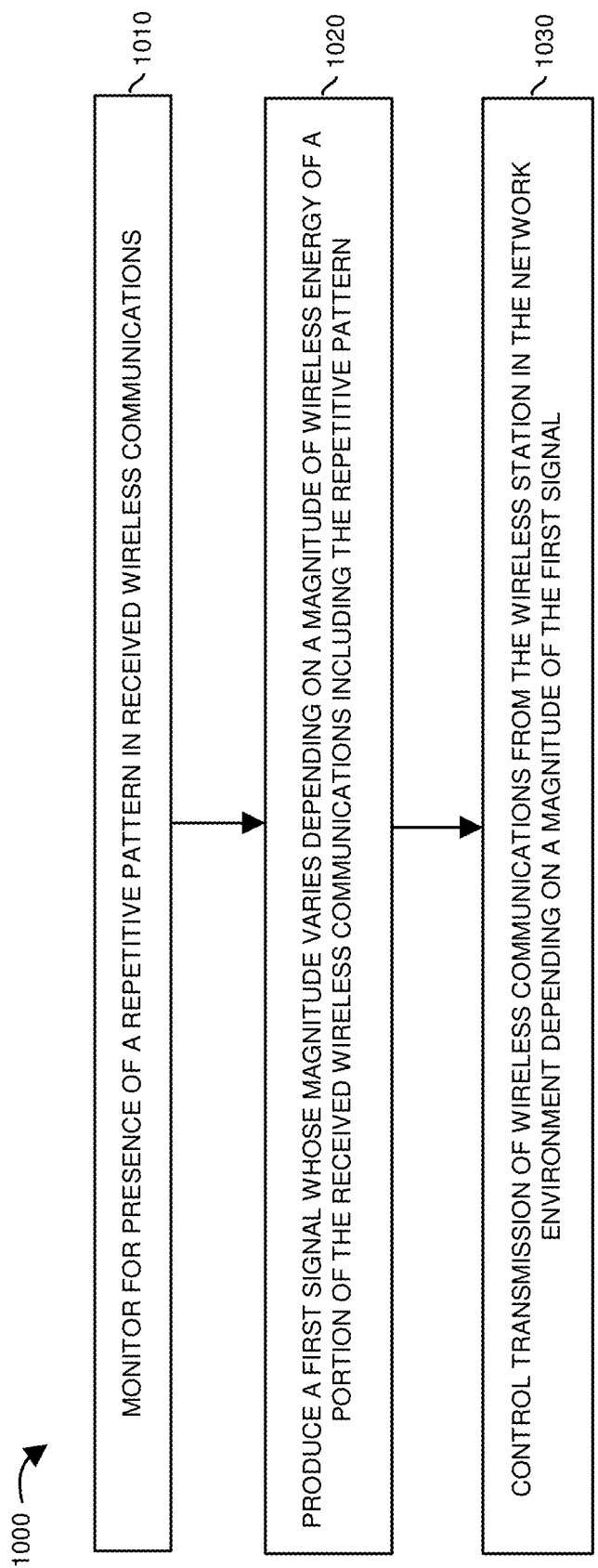
FIG. 10 is an example diagram illustrating a method according to embodiments herein.

FIG. 10 is a flowchart 1100 illustrating an example method according to embodiments herein. Note that there will be some overlap with respect to concepts as discussed above.

In processing operation 1010, the monitor resource 141 monitors for presence of a repetitive pattern (such as having attributes defined by one or more of setting #1, setting #2, setting #3, etc.) in received wireless communications (such as wireless signal 199 and corresponding signal 299).

In processing operation 1020, the monitor resource 141 produces a first signal (such as time domain repetition detection level indicated by signal 251, time domain repetition detection level as indicated by signal 252, time domain repetition detection level as indicated by signal 253, etc.) whose magnitude varies depending on a magnitude of wireless energy of a portion of the received wireless communications including the detected repetitive pattern.

In processing operation 1030, the communication manager 140 controls transmission of wireless communications 922 from the wireless station (mobile communication device 110) in the network environment 100 depending on a magnitude of the first signal.

Note again that techniques herein are well suited to identify use of different wireless protocols and corresponding signal strengths in a network environment and facilitate use of a shared wireless bandwidth amongst different types of wireless stations. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
at a wireless station in a network environment:
receiving configuration setting information, the configuration setting information specifying corresponding attributes of multiple different repetitive patterns implemented by different wireless communication protocols;
via the configuration setting information specifying corresponding attributes of the multiple different repetitive patterns, monitoring for presence of the multiple different repetitive patterns in received wireless communications;
based on the monitoring, detecting multiple instances of a first repetitive pattern of the multiple different repetitive patterns in the received wireless communications, the first repetitive pattern associated with a first wireless communication protocol of the different wireless communication protocols;
producing a first signal whose magnitude varies depending on a magnitude of wireless energy of a portion of the received wireless communications including the first repetitive pattern; and
controlling transmission of wireless communications from the wireless station in the network environment depending on a magnitude of the first signal.

2. The method as in claim 1, wherein controlling the transmission of wireless communications from the wireless station includes:
comparing the first signal to a first threshold value assigned to the first wireless communication protocol of the multiple different wireless communication protocols; and
preventing transmission of the wireless communications from the wireless station in response to detecting that the magnitude of the first signal is greater than the first threshold value.

3. The method as in claim 2 further comprising:
receiving timing attributes indicating a time difference value assigned to the first wireless communication protocol; and
based on the timing attributes, detecting a first instance of the first repetitive pattern delayed by the time difference value with respect to a second instance of the first repetitive pattern in the received wireless communications.

4. The method as in claim 1 further comprising:
receiving timing attributes associated with the first wireless communication protocol, the timing attributes indicating a time difference value in which to monitor for presence of the first repetitive pattern in the received wireless communications; and
based on the timing attributes, detecting a first instance of the first repetitive pattern delayed by the time difference value with respect to a second instance of the first repetitive pattern in the received wireless communications.

5. The method as in claim 1 further comprising:
identifying the portion of the received wireless communications including the first repetitive pattern based on a time difference between a first instance of the first repetitive pattern and a second instance of the first repetitive pattern in the received wireless communications, the time difference assigned to the first wireless communication protocol.

6. The method as in claim 1 further comprising:
producing a second signal whose magnitude varies depending on a strength of the received wireless communications transmitted in accordance with a second wireless communication protocol; and
controlling transmission of the wireless communications from the wireless station in the network environment depending on a magnitude of the second signal.

7. The method as in claim 6, wherein controlling transmission of the wireless communications from the wireless station in the network environment depending on the magnitude of the second signal includes:
comparing the second signal to a second threshold value; and
preventing transmission of the wireless communications from the wireless station in response to detecting that the magnitude of the second signal is greater than the second threshold value.

8. The method as in claim 7 further comprising:
temporarily adjusting a magnitude of the second threshold value depending on the magnitude of the first signal.

9. The method as in claim 1, wherein controlling transmission of wireless communications from the wireless station depending on the magnitude of the first signal includes:
adjusting a threshold value depending on the magnitude of the first signal; and
comparing a signal strength of the received wireless communications to the adjusted threshold value.

10. The method as in claim 1, wherein the wireless communications controlled depending on the magnitude of the first signal are of the first wireless communication protocol.

11. The method as in claim 10 further comprising:
monitoring the received wireless communications for a second repetitive pattern associated with a second wireless communication protocol.

12. The method as in claim 1 further comprising:
monitoring for presence of the first repetitive pattern in the received wireless communications in response to detecting an inability of the wireless station to acquire a shared wireless channel via a listen before talk protocol.

13. The method as in claim 1, wherein monitoring for presence of the first repetitive pattern includes:
monitoring the wireless network environment for the first repetitive pattern and a second repetitive pattern in a shared wireless channel, detection of the first repetitive pattern indicating use of the first wireless communication protocol over the shared wireless channel, detection of the second repetitive pattern indicating use of a corresponding second wireless communication protocol over the shared wireless channel.

14. The method as in claim 1, wherein monitoring for presence of the first repetitive pattern includes:
monitoring the wireless network environment for the first repetitive pattern and a second repetitive pattern in a shared wireless channel, the second repetitive pattern different than the first repetitive pattern, detection of the first repetitive pattern and the second pattern indicating use of a corresponding wireless communication protocol;

wherein the second repetitive pattern is a preamble communicated in a respective packet; and wherein the first repetitive pattern is a cyclic prefix pattern associated with a transmitted symbol in the data packet.

15. The method as in claim 1 further comprising:
at the wireless station, receiving the configuration setting information from a wireless base station; and
applying the configuration setting information to monitor hardware disposed in the wireless station, the monitor hardware operative to monitor for presence of the first repetitive pattern and a second repetitive pattern as indicated by the configuration setting information.

16. The method as in claim 15, wherein the first repetitive pattern corresponds to the first wireless communication protocol; and
wherein the second repetitive pattern corresponds to a second wireless communication protocol.

17. The method as in claim 1 further comprising:
receiving the configuration setting information from a wireless base station.

18. The method as in claim 1,
wherein detection, via a first communication analyzer resource, of the first repetitive pattern in the received wireless communications indicates a beginning of a first wireless communication, the method further comprising:
via a second communication analyzer resource, monitoring for presence of a second repetitive pattern in the first wireless communication.

19. The method as in claim 18 further comprising:
detecting presence of the second repetitive pattern in the first wireless communication, detection of the first repetitive pattern and the second repetitive pattern in the first wireless communication indicating that the first wireless communication is transmitted in accordance with the first wireless communication protocol and a second wireless communication protocol.

20. The method as in claim 18, wherein a second instance of the first repetitive pattern is detected as being present in the first wireless communication after an amount of time with respect to a first detected instance of the first repetitive pattern, detection of the second instance of the repetitive pattern after the amount of time indicative that the first wireless communication is transmitted in accordance with the first wireless communication protocol.

21. The method as in claim 1 further comprising:
identifying that the received wireless communications is communicated in accordance with the first wireless communication protocol based on a duration of time present between detecting a first instance of the first repetitive pattern and a second instance of the first repetitive pattern.

22. The method as in claim 1 further comprising:
at the wireless station:
monitoring for presence of a second repetitive pattern in the received wireless communications, the second repetitive pattern assigned to a second wireless communication protocol of the multiple wireless communication protocols;
based on the monitoring, detecting multiple instances of the second repetitive pattern;

producing a second signal whose magnitude varies depending on a magnitude of wireless energy of a portion of the received wireless communications including the second repetitive pattern; and
controlling transmission of the wireless communications from the wireless station in the network environment depending on a magnitude of the second signal.

23. The method as in claim 22, wherein presence of the first repetitive pattern in the received wireless communications is indicative of the first wireless communication protocol; and
wherein presence of the second repetitive pattern is indicative of the second wireless communication protocol.

24. The method as in claim 23 further comprising:
in response to detecting first communications in the received wireless communications including the first repetitive pattern transmitted in accordance with the first wireless communication protocol, which is assigned a higher priority than the second wireless communication protocol, preventing transmission of wireless communications from the wireless station using the second wireless communication protocol.

25. The method as in claim 24 further comprising:
determining that a wireless channel conveying the received wireless communications is currently unavailable for use based on the magnitude of the first signal and the magnitude of the second signal.

26. The method as in claim 25, wherein determining that the wireless channel conveying the received wireless communications is currently unavailable includes:
detecting that the first signal is greater than a first threshold value associated with the first wireless communication protocol.

27. The method as in claim 1 further comprising:
in response to detecting first wireless communications in the received wireless communications being transmitted via the first wireless communication protocol based on detected presence of the first repetitive pattern in the received wireless communications, preventing transmission of wireless communications from the wireless station using a second wireless communication protocol.

28. The method as in claim 1, wherein inclusion of the first repetitive pattern in the received wireless communications indicates that the received wireless communications include first wireless communications transmitted via the first wireless communication protocol, the first wireless communication protocol being assigned a higher priority than a second wireless communication protocol at which the wireless station is configured to transmit communications, the method further comprising:
in response to detecting that a magnitude of the first signal is greater than a threshold value associated with the first wireless communication protocol, preventing transmission of wireless communications from the wireless station using the second wireless communication protocol.

29. The method as in claim 1, wherein the multiple instances of the first repetitive pattern include a first instance of the first repetitive pattern and a second instance of the first repetitive pattern, the method further comprising:
determining that the received wireless communications include communications according to the first wireless communication protocol based on a duration of time between a first instance of the first repetitive pattern and a second instance of the first repetitive pattern in the received wireless communications.

30. The method as in claim 1, wherein detecting multiple instances of the first repetitive pattern includes:
detecting absence of a delay time between a first instance of the first repetitive pattern and a second instance of the first repetitive pattern.

31. A wireless station comprising:
monitor hardware operative to: i) receive configuration setting information, the configuration setting information specifying corresponding attributes of multiple different repetitive patterns implemented by different wireless communication protocols; ii) via the configuration setting information specifying corresponding attributes of the multiple different repetitive patterns, monitor for presence of the multiple different repetitive patterns in received wireless communications; iii) based on the monitoring, detect multiple instances of a first repetitive pattern of the multiple different repetitive patterns in the received wireless communications, the first repetitive pattern associated with a first wireless communication protocol of the different wireless communication protocols; and iv) produce a first signal whose magnitude varies depending on a magnitude of wireless energy of a portion of the received wireless communications including the first repetitive pattern; and
communication management hardware operative to control transmission of wireless communications from a wireless station in a network environment depending on a magnitude of the first signal.

32. The wireless station as in claim 31, wherein the communication management hardware is further operative to:
compare the first signal to a first threshold value associated with the first wireless communication protocol; and
prevent transmission of the wireless communications from the wireless station in response to detecting that the magnitude of the first signal is greater than the first threshold value.

33. The wireless station as in claim 31, wherein the monitor hardware is further operative to:
receive timing attributes associated with the first wireless communication protocol, the timing attributes indicating a time difference value in which to monitor for presence of the first repetitive pattern in the received wireless communications; and
identify the wireless communications including the first repetitive pattern based on detecting a first instance of the first repetitive pattern delayed by the time difference value with respect to a second instance of the first repetitive pattern in the received wireless communications.

34. The wireless station as in claim 31, wherein the monitor hardware is further operative to:
identify the portion of the received wireless communications including the first repetitive pattern based on a time difference between a first instance of the first repetitive pattern and a second instance of the first repetitive pattern in the received wireless communications, the time difference assigned to the first wireless communication protocol.

35. The wireless station as in claim 31, wherein the monitor hardware is further operative to produce a second signal whose magnitude varies depending on a strength of the received wireless communications transmitted in accordance with a second wireless communication protocol; and
wherein the communication management hardware is further operative to control transmission of the wireless communications from the wireless station in the network environment depending on a magnitude of the second signal.

36. The wireless station as in claim 35, wherein the communication management hardware is further operative to:
compare the second signal to a second threshold value; and
prevent transmission of the wireless communications from the wireless station in response to detecting that the magnitude of the second signal is greater than the second threshold value.

37. The wireless station as in claim 36, wherein the communication management hardware is further operative to adjust a magnitude of the second threshold value depending on the magnitude of the first signal.

38. The wireless station as in claim 31, wherein the communication management hardware is further operative to:
adjust a threshold value depending on the magnitude of the first signal; and
compare a signal strength of the received wireless communications to the adjusted threshold value.

39. The wireless station as in claim 31, wherein the monitor hardware is further operative to monitor for presence of the first repetitive pattern in the received wireless communications in response to detecting an inability of the wireless station to acquire a shared wireless channel implementing a listen before talk protocol.

40. The wireless station as in claim 31, wherein the monitor hardware is further operative to monitor the wireless network environment for a first repetitive pattern and a second repetitive pattern in a shared wireless channel, detection of the first repetitive pattern indicating use of the first wireless communication protocol over the shared wireless channel, detection of the second repetitive pattern indicating use of a corresponding second wireless communication protocol over the shared wireless channel.

41. The wireless station as in claim 31, wherein the communication management hardware further operative to:
receive the configuration setting information from a wireless base station; and
apply the configuration setting information to the monitor hardware disposed in the wireless station, the monitor hardware operative to monitor for presence of the first repetitive pattern and a second repetitive pattern as indicated by the configuration setting information.

42. The wireless station as in claim 41, wherein the first repetitive pattern corresponds to the first wireless communication protocol; and
wherein the second repetitive pattern corresponds to a second wireless communication protocol.

43. The wireless station as in claim 31, wherein the monitor hardware is further operative to receive the configuration setting information from a wireless base station, the configuration setting information indicating attributes of the first repetitive pattern to monitor in the wireless network environment.

44. Computer-readable storage hardware having instructions stored thereon, the instructions, when carried out by computer processor hardware, cause the computer processor hardware to:

receive configuration setting information, the configuration setting information specifying corresponding attributes of multiple different repetitive patterns implemented by different wireless communication protocols;

via the configuration setting information specifying corresponding attributes of the multiple different repetitive patterns, monitor for presence of the multiple different repetitive patterns in the received wireless communications;

based on the monitoring, detect multiple instances of a first repetitive pattern of the multiple different repetitive patterns in the received wireless communications, the first repetitive pattern associated with a first wireless communication protocol of the different wireless communication protocols;

produce a first signal whose magnitude varies depending on a magnitude of wireless energy of a portion of the received wireless communications including the first repetitive pattern; and control transmission of wireless communications from the wireless station in the network environment depending on a magnitude of the first signal.

* * * * *